(12) United States Patent
Howe

(10) Patent No.: US 8,544,373 B2
(45) Date of Patent: Oct. 1, 2013

(54) SPLINE ARBOR GUIDED SAW BLADE

(75) Inventor: Robert Howe, Gray, GA (US)

(73) Assignee: Simonds International Corporation, Fitchburg, MA (US)

( * ) Notice: Subject to any disclaimer, the term of this patent is extended or adjusted under 35 U.S.C. 154(b) by 879 days.

(21) Appl. No.: 12/267,984

(22) Filed: Nov. 10, 2008

(65) Prior Publication Data
US 2010/0116116 A1 May 13, 2010

(51) Int. Cl.
B26D 1/12 (2006.01)

(52) U.S. Cl.
USPC .............. 83/663; 83/665; 83/676; 83/698.11; 83/698.41

(58) Field of Classification Search
USPC ........... 83/665, 666, 676, 677, 425.4, 698.41, 83/698.11; 403/358, 359.1
See application file for complete search history.

(56) References Cited

U.S. PATENT DOCUMENTS

| | | | | |
|---|---|---|---|---|
| 3,516,460 A * | 6/1970 | Thrasher | ............................ | 83/13 |
| 3,645,304 A * | 2/1972 | Thrasher | ......................... | 83/821 |
| 4,747,607 A * | 5/1988 | Emter | ............................ | 279/133 |
| 4,827,800 A * | 5/1989 | Pedersen et al. | ............... | 475/162 |
| 5,022,299 A * | 6/1991 | Fischer et al. | ................... | 83/676 |
| 5,235,885 A * | 8/1993 | Camarena et al. | .............. | 83/146 |
| 6,065,215 A * | 5/2000 | Arai | ................................ | 30/319 |
| 6,158,320 A | 12/2000 | Vallance et al. | | |
| 6,321,627 B1 | 11/2001 | Taylor et al. | | |
| 6,591,715 B2 | 7/2003 | Avis | | |
| 6,988,438 B2 * | 1/2006 | McGehee et al. | ............ | 83/425.4 |
| 2001/0037715 A1 | 11/2001 | McGehee et al. | | |
| 2004/0007437 A1 | 1/2004 | Linzell | | |
| 2004/0011173 A1 | 1/2004 | McGehee et al. | | |
| 2005/0011328 A1 | 1/2005 | McGehee et al. | | |
| 2006/0175770 A1 | 8/2006 | Linzell | | |

* cited by examiner

Primary Examiner — Omar Flores Sanchez
(74) Attorney, Agent, or Firm — Mirick, O'Connell, DeMallie & Lougee, LLP

(57) ABSTRACT

A saw blade includes a saw blade body having a first face, a second face opposing the first face, and an axis of rotation extending between the first face and the second face. The saw blade includes a cutting element disposed about an outer periphery of the saw blade body. The saw blade includes a spline arbor interface portion disposed about an inner periphery of the saw blade body and having a peripheral face defining an eye disposed substantially collinearly with the axis of rotation of the saw blade body. The saw blade body defines a relief portion extending along at least a portion of an edge between the peripheral face of the spline arbor interface portion and at least one of the first face and the second face.

12 Claims, 9 Drawing Sheets

SPLINE ARBOR GUIDED SAW BLADE

BACKGROUND

Circular saw blades, such as used for cutting lumber, typically include a mounting hole or eye disposed through a central axis of the saw blade and a set of teeth disposed about the periphery of the saw blade. The saw blade mounts to an arbor by disposing the arbor within the mounting hole. When the arbor is connected to a drive power source, such as a motor, the drive power source causes the arbor and the saw blade to rotate along a rotation direction.

While circular saw blades can be used in a variety of applications, in one application, a set of circular saw blades are used in a process known as guided sawing. In guided sawing applications, saw blades are fitted to an arbor but not clamped to that arbor in any way. The saw blades are held in position with guides mounted on both sides of the saw blade that provide for the exact thickness of the lumber to be cut, less one or two thousandths of an inch clearance between the body of the saw blade and the guide, plus the thickness of the sawdust line the saw will produce (known as kerf).

The guided sawing arbor typically includes a set of outwardly projecting, parallel splines disposed about the periphery of the arbor. Each guided sawing saw blade of the set includes a mounting hole formed with a spline shape that substantially matches the arbor's cross-sectional shape, thereby allowing the saw blades to mechanically interface with the arbor. Additionally, each of the mounting holes defines a clearance space between the saw blade and the curve sawing arbor, thereby allowing the saw blades to travel or slide relative to the longitudinal axis of the arbor. In guided sawing applications, the saw blade can move freely on the saw arbor (i.e., via a center hole defined by the saw blade), to the extent that the guide allows. A mixture of air, oil, and water is forced through the body of the guide so that the saw blade floats on this very thin cushion as it rotates.

The development of guided sawing technology has further developed into curve sawing technology using circular saws. In this application, the set of guided saw blades are configured to cut a bowed log into straight boards in order to minimize the amount of waste generated during the board manufacturing process and to maximize the quality of the boards generated from the log. For example, a curve sawing system includes a curve sawing arbor, a set of curve sawing blades disposed on the arbor, and a set of saw guides as described above mounted on arbors parallel to the saw blade arbor. In modern curve sawing applications either the entire section of the sawing machine that contains the saw blades, the saw blade arbor, the saw guides, and the saw guide arbors is manipulated to align with the shape of the log being cut, or the log is manipulated to align with the saws.

In curve sawing applications, as the arbor rotates the set of saw blades relative to a longitudinal axis of a bowed log, the splines of the arbor engage a drive surface of the mounting hole to rotate the saw blade along a rotational direction. As the rotating saw blades engage the bowed log, a controller, such as a computer system, steers the set of blades to substantially follow the curvature of the bowed log. Because each of the saw blades can slide along the longitudinal axis of the arbor between adjacent guide elements, the saw blades substantially follow the curvature of the bowed log thereby maximizing the yield of boards generated from the curved logs while reducing the amount of stress absorbed by the saw blades during the cutting procedure.

SUMMARY

Conventional guided sawing and curve sawing systems, however, suffer from a variety of deficiencies. For example, the saw blades can slide along the longitudinal axis of the arbor to minimize the amount of stress absorbed. However, conventional saw blade mounting holes or eyes include a relatively sharp edge. For example, when a manufacturer forms the eye in the saw blade, such as by using a laser cutting process, the process can create a substantially 90° edge between an inner face of the eye and the opposing surfaces of the saw blade. Accordingly, even though the mounting hole on the saw blade is larger than an outer diameter of the arbor, during operation, as the saw blade slides along the longitudinal axis of the arbor, the relatively sharp edges of the saw blade eye create gouges or grooves in the arbor. As the arbor rotates the saw blade eye typically becomes aligned with, and sits within, the formed groove thereby minimizing the ability for the saw blade to translate along the longitudinal axis of the arbor. As a result, during operation, as the saw blade cuts the force of the cut can expose the saw blade to a relatively large amount of stress, thereby generating a relatively large amount of heat in the center of the saw blade and resulting in a loss of saw blade tension and an increased wear rate.

By contrast to conventional guided sawing systems and saw blade, embodiments of the present invention relate to a saw blade, such as used in a guided sawing application, having a relief portion associated with a spline arbor interface portion of the saw blade. The relief portion breaks or relieves a square corner formed between the faces of the saw blade and a center hole in the saw blade. The relief portion helps to reduce the amount of wear in the arbor, thereby extending the arbor's useful life and decreasing the maintenance time required to keep the arbor in good repair. Additionally, by reducing the amount of wear in the arbor, the relief portion minimizes the creation of grooves that typically develop in the arbor, thereby allowing the saw blade to move more freely on the arbor and produce more accurately cut lumber. While the relief portion can have a variety of configurations, the relief portion can be configured as either a chamfer, a convex radius, or as a concave radius.

In one arrangement, a saw blade includes a saw blade body having a first face, a second face opposing the first face, and an axis of rotation extending between the first face and the second face. The saw blade includes a cutting element disposed about an outer periphery of the saw blade body. The saw blade includes a spline arbor interface portion disposed about an inner periphery of the saw blade body and having a peripheral face defining an eye disposed substantially collinearly with the axis of rotation of the saw blade body. The saw blade body defines a relief portion extending along at least a portion of an edge between the peripheral face of the spline arbor interface portion and at least one of the first face and the second face.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Embodiments of the present invention relate to a saw blade, such as used in a guided sawing application, having a relief portion associated with a spline arbor interface portion of the saw blade. The relief portion breaks or relieves a square corner formed between a face of the saw blade and a center hole in the saw blade. The relief portion helps to reduce the amount of wear on an associated arbor during use, thereby extending the arbor's useful life and decreasing the maintenance time required to keep the arbor in good repair. Additionally, by reducing the amount of wear in the arbor, the relief portion minimizes the creation of grooves that typically develop in the arbor, thereby allowing the saw blade to move more freely on the arbor and produce more accurately cut lumber. While the relief portion can have a variety of configurations, the relief portion can be shaped as having either a chamfer, a convex radius, or as a concave radius.

Figure 1A:
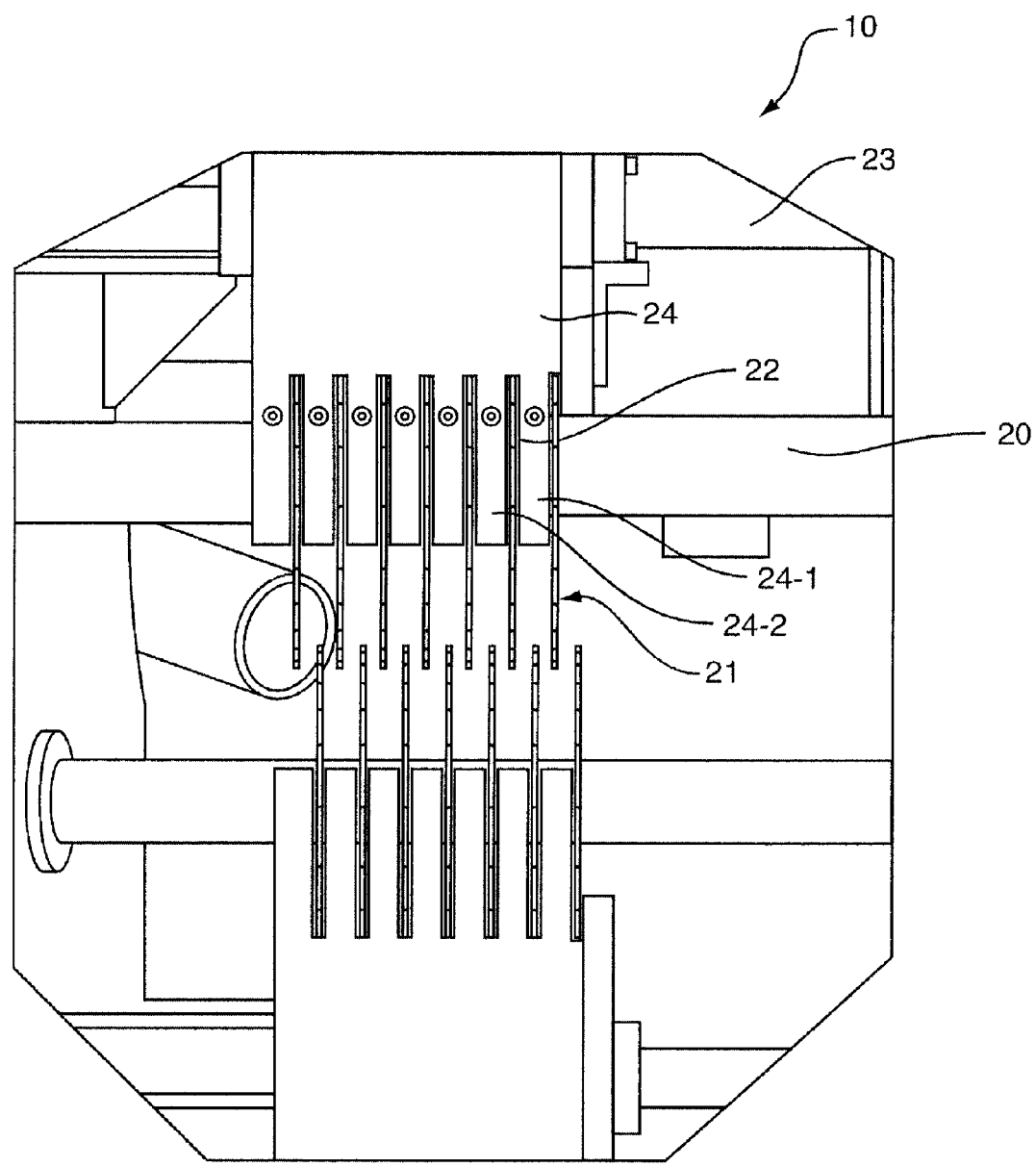
FIG. 1A illustrates a cutting system, according to one embodiment.

FIG. 1A illustrates an example of a cutting system 10, such as used in the process of guided sawing. The cutting system 10 includes a spline arbor 20, a set of sawing blades 21 disposed on the spline arbor 20, and a saw guide 24 disposed between adjacent saw blades and carried by a guide arbor 23. Depending upon the number of boards to be cut during a guided sawing process, as illustrated in FIG. 1A, the spline arbor 20 can carry a set 21 of between three and seventy circular saw blades thereon, with an appropriate number of saw guides.

Figure 1B:
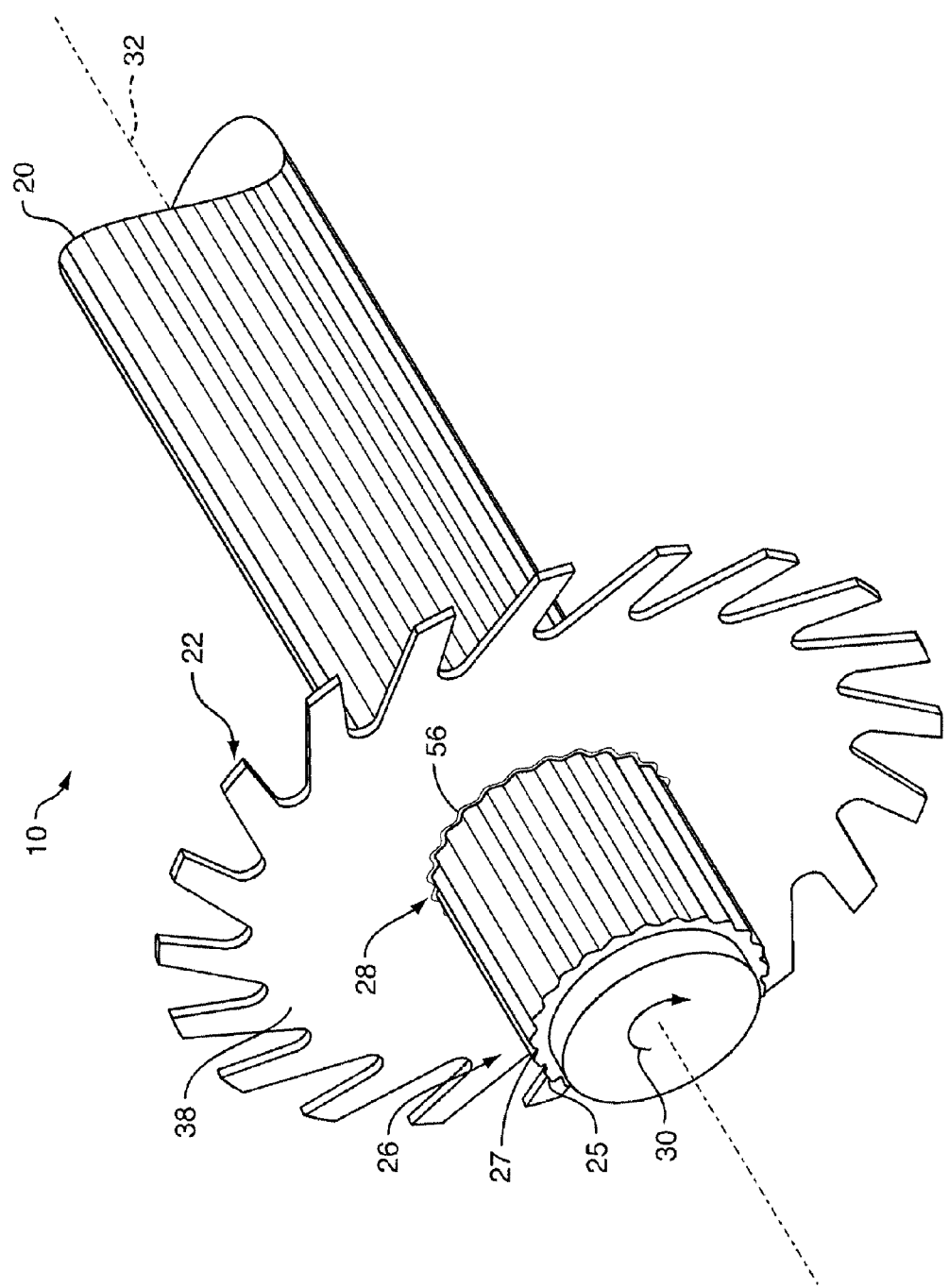
FIG. 1B illustrates a perspective view of a schematic representation of a saw blade and spline arbor of the cutting system of FIG. 1A.

With additional reference to FIG. 1B, which illustrates a single saw blade 22 and spline arbor 20 for clarity, the spline arbor 20 including a set of splines 26 disposed about a periphery, and along a length, of the spline arbor 20. In one arrangement the splines 26 include a major diameter portion 25 (e.g., a peak of the spline) and a minor diameter portion 27 (e.g., a trough of the spline). The splines 26 are configured to engage an eye or mounting hole 28 defined by the saw blade 22. For example, the mounting hole 28 defined by the saw blade 22 is configured with a spline shape that substantially mirrors the shape of the set of splines 26 (i.e., the shape of the mounting hole 28 mirrors a cross-sectional shape of the spline arbor 20). In such a configuration, the saw blade 22 mechanically interfaces with the spline arbor 20, thereby allowing the spline arbor 20 to engage and rotate the saw blade 22 along a rotational or drive direction 30 in use.

When carried by the spline arbor 20, each saw blade 22 of the set of saw blades is configured to travel or slide relative to a longitudinal axis 32 of the spline arbor 20 as needed to conform to saw guide 24. For example, with reference to FIG. 1A, a saw blade 22 is configured to slide along a portion of the spline arbor 20 between a first guide element 24-1, disposed distal to the saw blade 22, and a second guide element 24-2 disposed proximal to the saw blade 22. Various configurations of the saw blade 22 and the spline arbor 20 can be used to allow the saw blade 22 to slide along the portion. In one arrangement, the mounting hole 28 defined by the saw blade 22 and the set of splines 26 define a clearance space of between about 0.005 inches and 0.015 inches. Such clearance allows longitudinal movement of the saw blade 22 relative to the spline arbor 20 during use.

Figure 2:
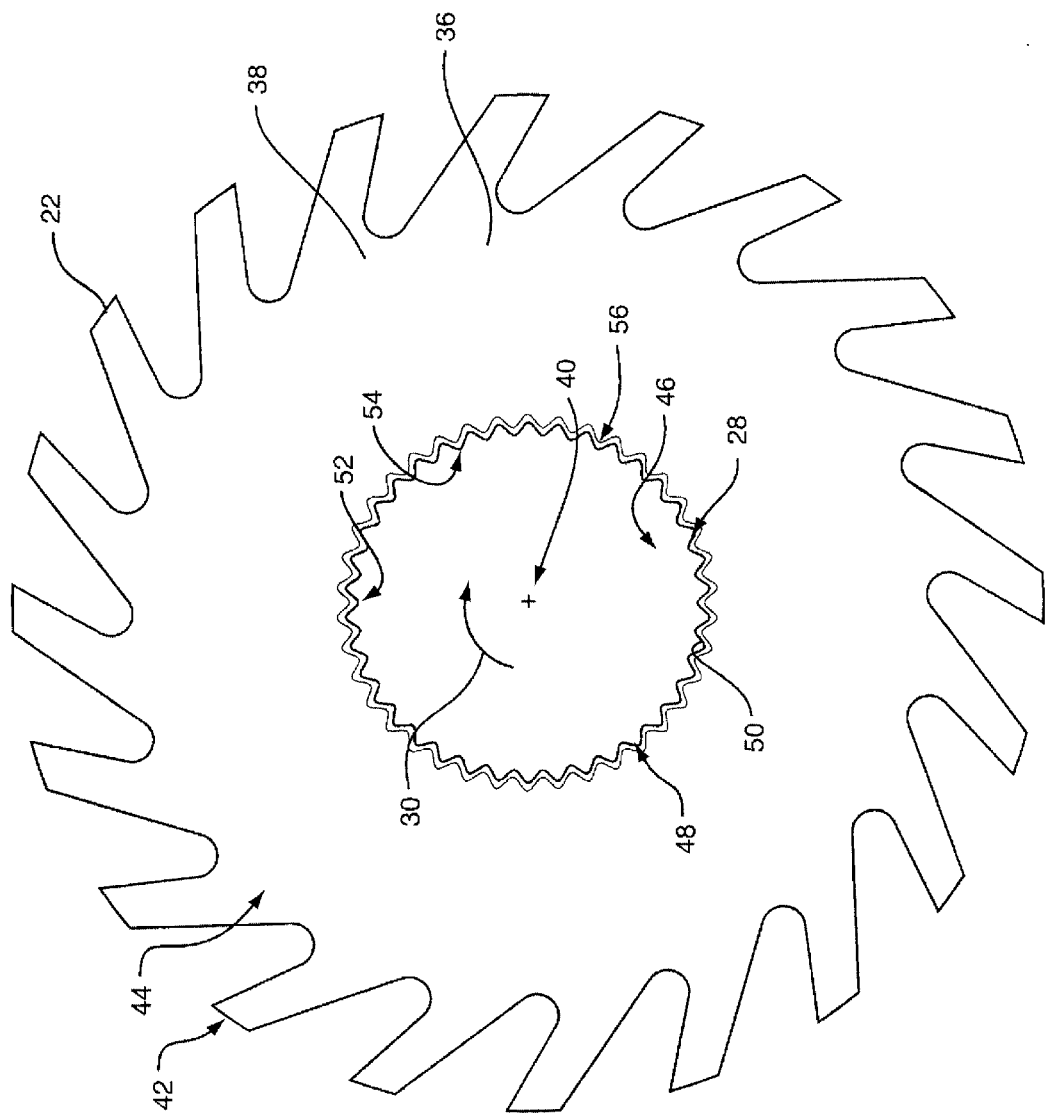
FIG. 2 illustrates a front view of a saw blade, such as used with the cutting system of FIG. 1B, the saw blade having a lobe-shaped spline arbor interface portion.

FIG. 2 illustrates a schematic representation of a side view of the saw blade 22 of FIGS. 1A and 1B. The saw blade 22 includes a saw blade body 36 having a first face 38 and an opposing second face (not shown). The saw blade body 36 also includes an axis of rotation 40 configured to be disposed substantially collinearly with the longitudinal axis 32 of the spline arbor 20 when the spline arbor 20 carries the saw blade 22. The saw blade also includes a cutting element 42 disposed about an outer periphery 44 of the saw blade body 36. For example, the cutting element 42 is configured as a set of teeth disposed about the outer periphery of the saw blade body 36. The saw blade also includes a spline arbor interface portion 46 disposed about an inner periphery 48 of the saw blade body 36. The spline arbor interface portion 46 has a peripheral face 50 that define an eye or mounting hole 28 of the saw blade 22. As indicated above, the spline arbor interface portion 46 is configured with a spline shape that substantially mirrors the shape of the spline arbor 20. For example, the spline arbor interface portion 46 includes a major diameter portion 52 that corresponds to the a major diameter portion 25 of the spline arbor 20 and a minor diameter portion 54 that corresponds with the minor diameter portion 27 of the spline arbor 20.

As indicated in FIGS. 1B and 2, the saw blade 22 includes a relief portion 56 configured to reduce an amount of wear generated on the spline arbor 20 during use. For example, as shown in FIGS. 1 and 2, the saw blade body 36 defines the relief portion 56 as extending along a portion of the saw blade 22 between the peripheral face 50 of the spline arbor interface portion 46 and the first face 38 of the saw blade 22. While not illustrated, the relief portion 56 can also extend along a potion of the saw blade 22 between the peripheral face 50 of the spline arbor interface portion 46 and the second, opposing face of the saw blade 22 as well. The relief portion 56 breaks the corner formed between the first face 38 of the saw blade 22 (and/or the second face of the saw blade 22) and the peripheral face 50 of the spline arbor interface portion 46. Accordingly, the presence of the relief portion 56 minimizes contact between the saw blade 22 and the spline arbor interface portion 46.

For example, and with particular reference to FIG. 1B, as the spline arbor 20 rotates the saw blade 22 along the rotation direction 30 a rightmost drive portion of the spline arbor 20 contacts a leftmost drive portion of the peripheral face 50 of the spline arbor interface portion 46. At this interface between the spline arbor 20 and the saw blade 20, because the relief portion 56 minimizes or eliminates a sharp edge contact between the saw blade 22 and the spline arbor interface portion 46, as the saw blade 22 translates along the portion of the spline arbor 20, the relief portion 56 decreases the amount of wear experienced by the spline arbor 22 as compared to conventional arbors. Such a decreased amount of wear allows the saw blades 22 to move more freely along the portion of the spline arbor 20 between adjacent saw guides 24, thereby allowing the saw blade 22 to produce more accurately cut lumber. Additionally, the presence of the relief portion 56 extends the useful life of the spline arbor 22, thereby reducing the number of replacement spline arbors 22 to be purchased by a manufacturer and decreasing the amount of time spent by the manufacturer in replacing the spline arbors 22.

The presence of the relief portion 56 can also impact the performance of the saw blade 22. For example, the relief portion minimizes the development of burrs at the interface between the first face 38 of the saw blade 22 (and/or the second face of the saw blade 22) and the peripheral face 50 of the spline arbor interface portion 46. Conventionally, burrs add to the cost of maintaining the system 10. For example, each time a manufacturer replaces conventional saw blades in a cutting system, operators file down burrs present along the edge of the mounting hole in order to inspect the saw for flatness and tension. Because the cutting systems can include as many as 72 saws, such a process is costly and time consuming. The presence of the relief portion 56 minimizes the generation of burrs, thereby reducing the amount of work required in maintaining the saw blades 22.

Figure 3:
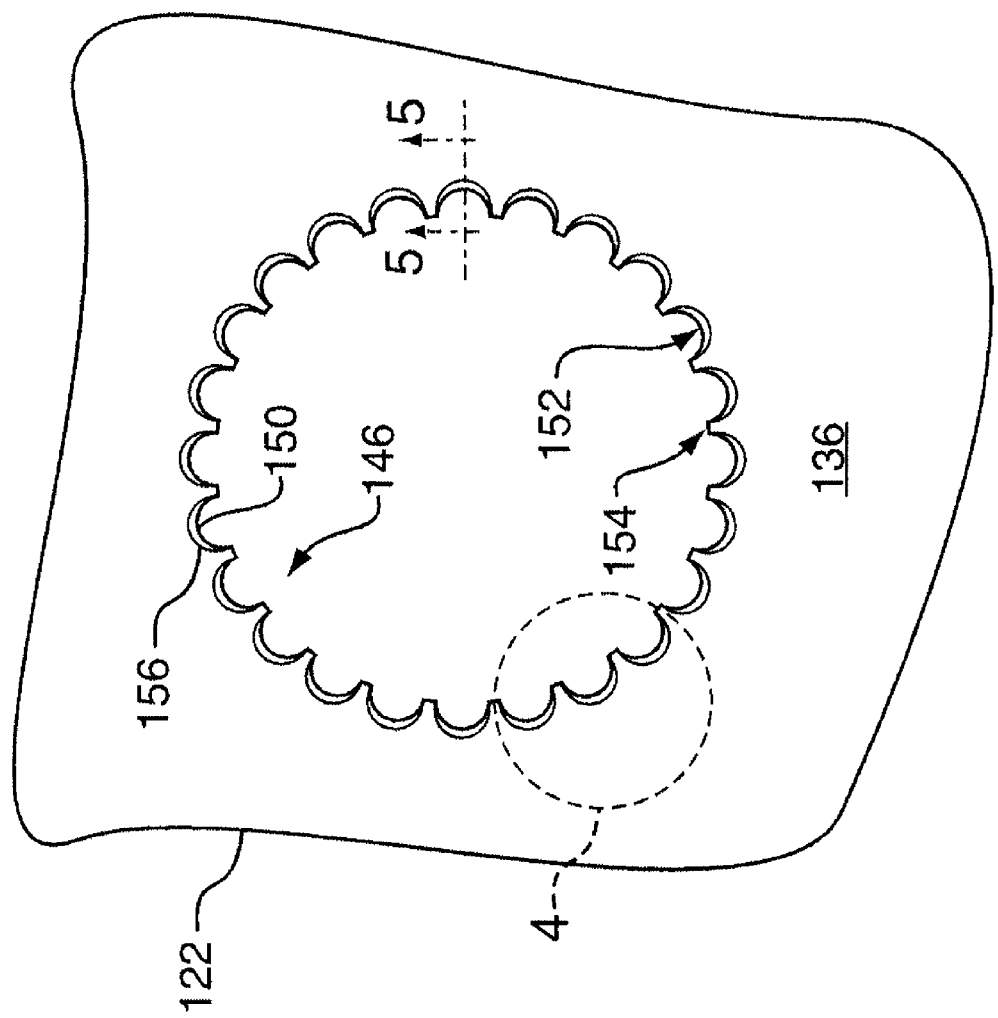
FIG. 3 illustrates an arrangement of a relief portion associated with the lobe-shaped spline arbor interface portion of the saw blade of FIG. 2.
Figure 4:
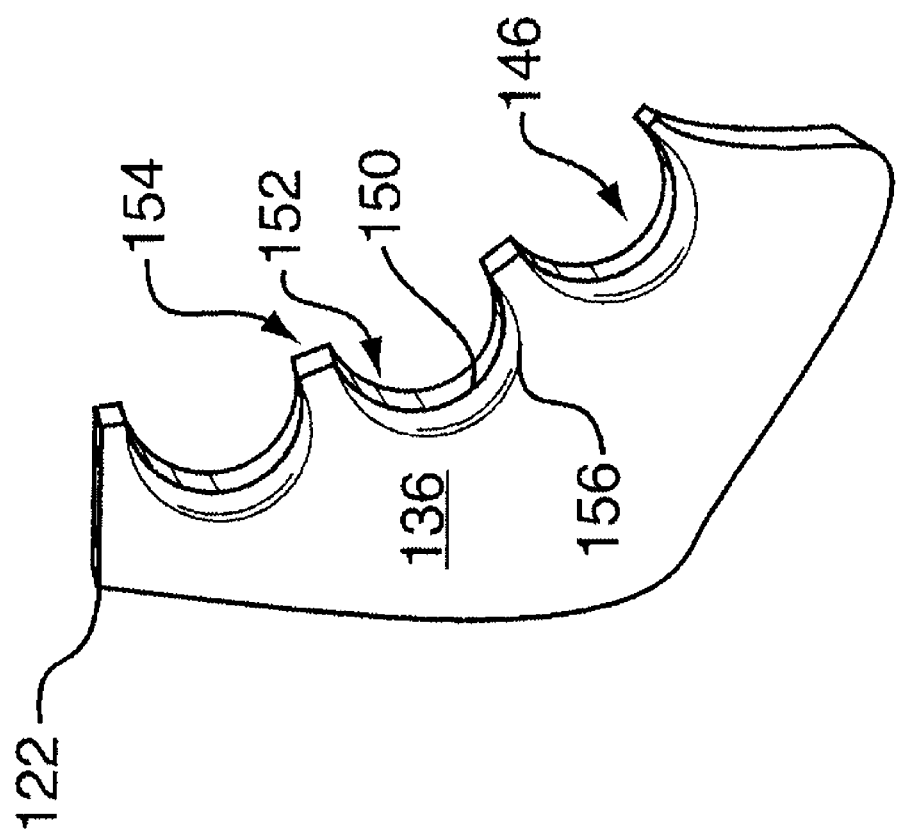
FIG. 4 illustrates a magnified perspective view of a portion of the lobe-shaped spline arbor interface portion of FIG. 3.
Figure 5:
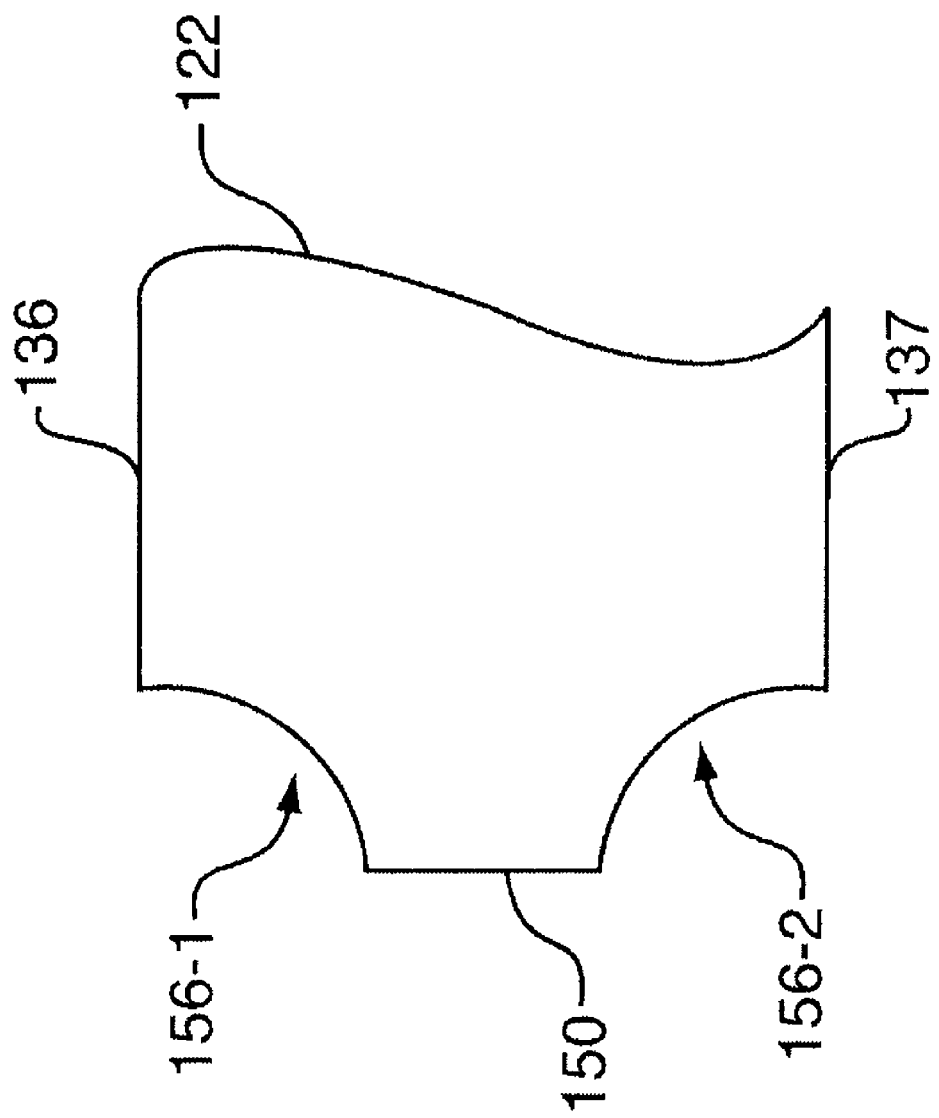
FIG. 5 illustrates a cut-away side view of the saw blade of FIG. 3.

As indicated above, the relief portion 56 extends along a portion of the saw blade 22 between the peripheral face 50 of the spline arbor interface portion 46 and the first face 38 (and/or the second face) of the saw blade 22. The relief portion 56 can have a variety of configurations based upon the type of saw blade 22 used in the system 10. In one arrangement, as illustrated in FIGS. 3-5, the saw blade 122 includes a spline arbor interface portion 146 having a set of lobe-shaped portions. For example, with particular reference to FIGS. 3 and 4, the spline arbor interface portion 146 includes a set of major diameter interface elements 152 and a set of minor diameter interface elements 154. As shown, each of the major diameter interface elements 152 define a lobe or curve shape relative to adjacent minor diameter interface elements 154. With such a configuration of the saw blade 122, the saw blade 122 includes relief portions 156 that extend along each of the major diameter interface elements 152 between adjacent minor diameter interface elements 154 to break a corner between, for example, a first face 136 of the saw blade 122 and a peripheral face 150 of the spline arbor interface portion 146.

With continued reference to FIGS. 3-5, while the relief portion 156 can have a variety of geometries, in one arrangement, as illustrated in FIG. 5, the relief portion 156 is configured as a relief having a concave shape. As shown, the concavely-shaped relief portions 156-1, 156-2 are disposed on opposing faces 136, 137 of the saw blade 122. In one arrangement, in order to apply the chamfer 156 to the saw blade 122, a manufacturer aligns each of the major diameter interface elements 152 with a grinding apparatus, such as a spherically-shaped sander element. As the sander element rotates relative to each of the major diameter interface elements 152, the sander element remove material from the interface between the first and/or second face of the saw blade 122 and the peripheral face 150 of the spline arbor interface portion 146. As a result of such a procedure, the sander element produces the concavely-shaped relief portions 156-1, 156-2 that extend along the length of each of the lobe-shaped major diameter interface elements 152.

Figure 6:
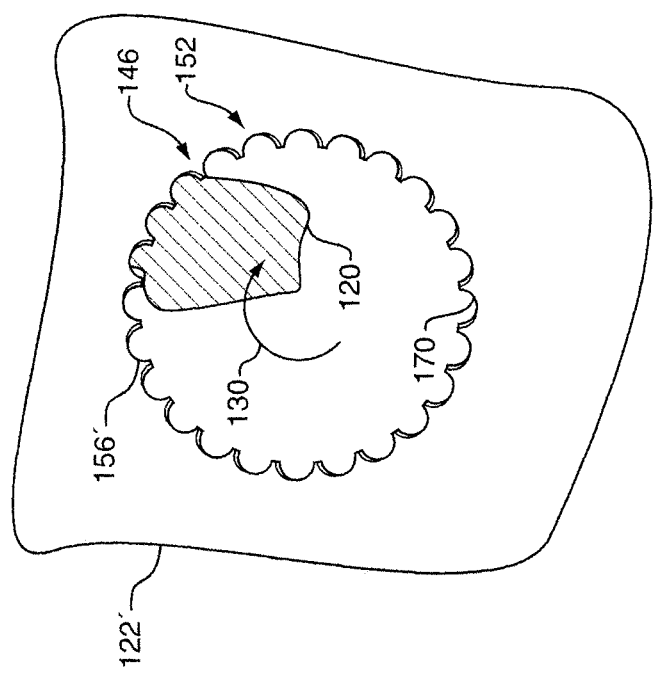
FIG. 6 illustrates an arrangement of a relief portion associated with the lobe-shaped spline arbor interface portion of the saw blade of FIG. 2.

While FIGS. 3-5 show the relief portions 156 as extending along the length of each of the major diameter interface elements 152, in one arrangement, the relief portions 156 is configured to extend along only a portion of each of the major diameter interface elements 152. For example, as illustrated in FIG. 6, the relief portion 156' extends along a drive portion 170 of each major diameter interface element 156. In use, because the spline arbor 120 defines a clearance space with the saw blade 122', as the spline arbor 120 rotates the saw blade 122' along the rotation direction 130 a rightmost or drive portion of the spline arbor 120 contacts a leftmost or drive portion of the major diameter interface element 156. Accordingly, the presence of the relief portions 156' relative to the drive portion 170 of each major diameter interface element 152 controls contact between the spline arbor 120 and the spline arbor interface portion 146, thereby minimizing wear of the spline arbor 120 in use.

Figure 7:
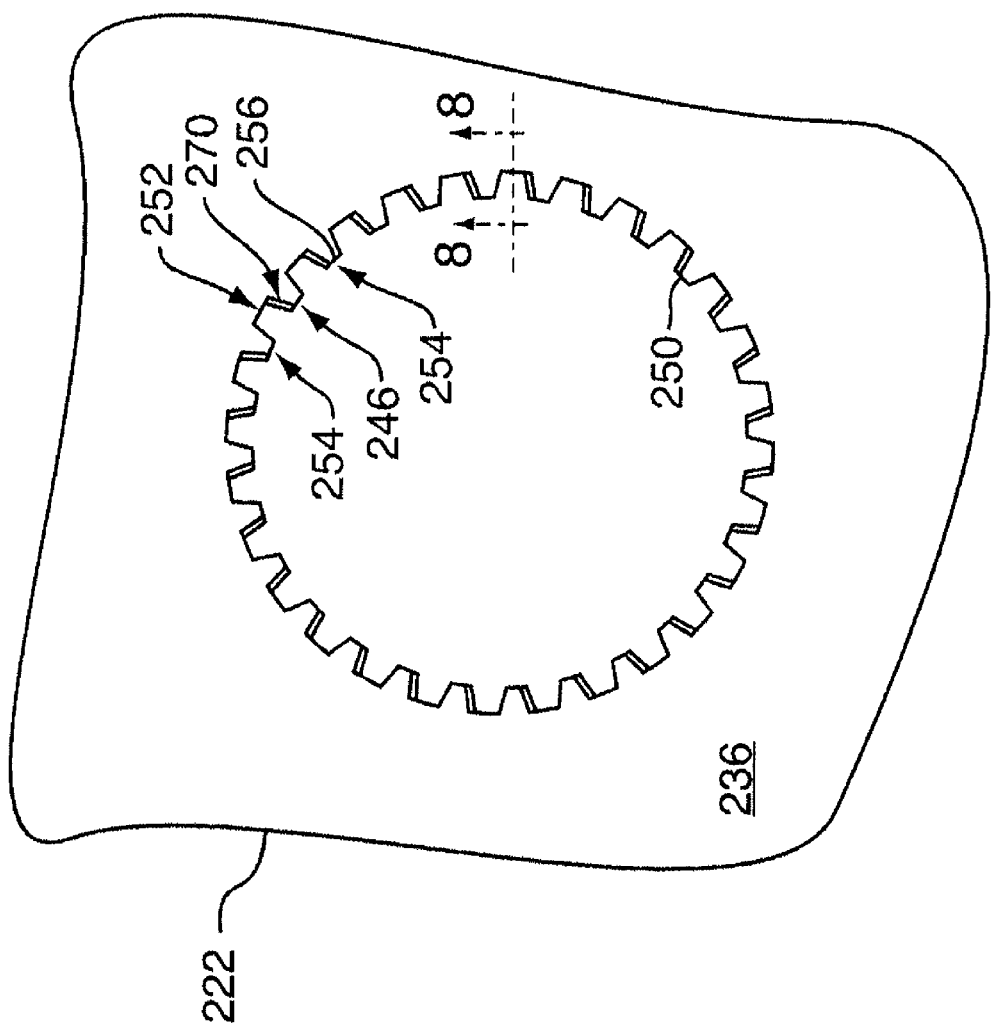
FIG. 7 illustrates an arrangement of a relief portion associated with a tooth-shaped spline arbor interface portion of the saw blade of FIG. 2.
Figure 8:
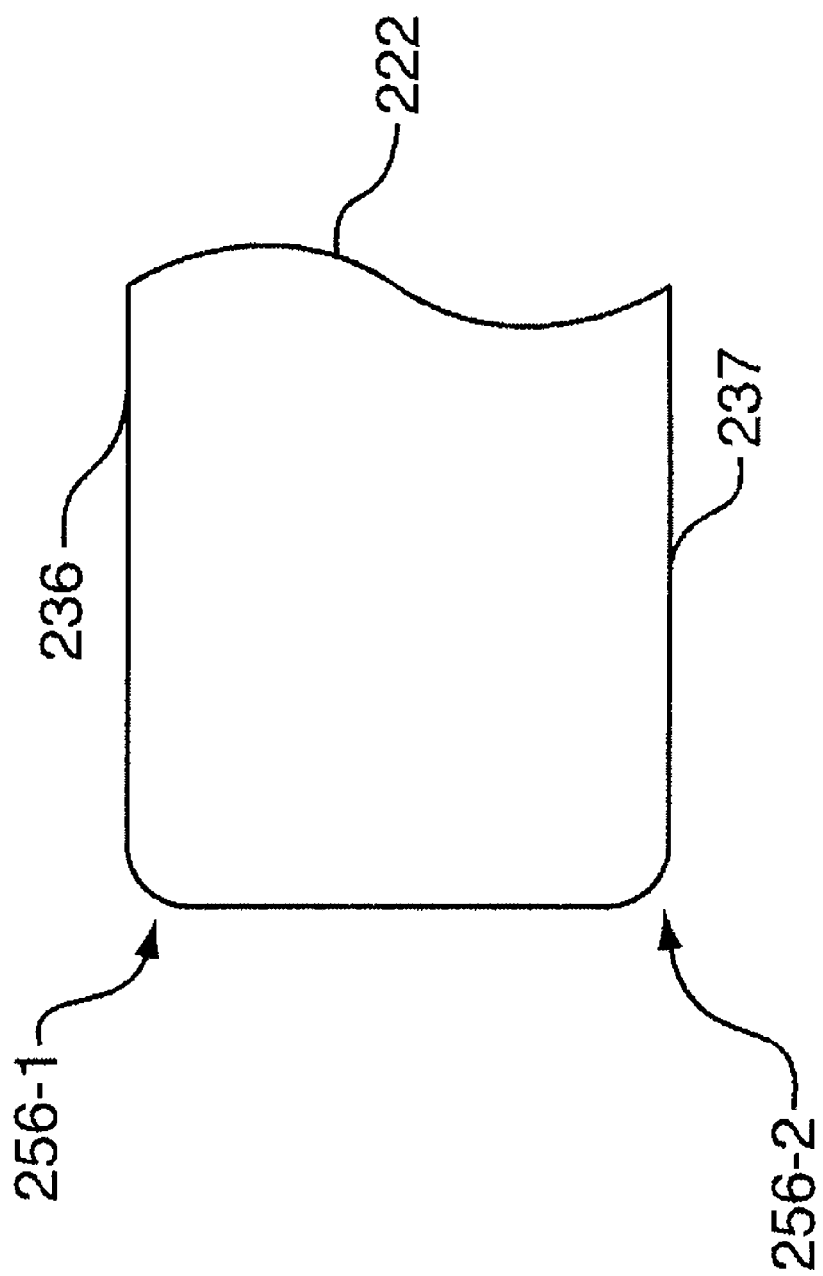
FIG. 8 illustrates a cut-away side view of the saw blade of FIG. 7.

As indicated above, the relief portion can have a variety of configurations based upon the type of saw blade used in the system 10. In one arrangement, as illustrated in FIGS. 7 and 8, a saw blade 222 includes a spline arbor interface portion 246 where each major diameter interface element 252 defines a tooth shape relative to adjacent minor diameter interface elements 254. In such an arrangement, a relief portion 256 extends along a drive portion 270 of each major diameter interface element 254 to break a corner between, for example, a first face 236 of the saw blade 222 and a peripheral face 250 of the spline arbor interface portion 246. The presence of the relief portions 256 relative to the drive portions 270 of each major diameter interface element 252 controls contact between the spline arbor and the spline arbor interface portion 246, thereby minimizing wear of the spline arbor in use.

While the relief portion 256 can have a variety of geometries, in one arrangement, as illustrated in FIG. 8, the relief portion 256 is configured as having a rounded-over or convex radius. As shown, the convexly-shaped or rounded-over relief portions 256-1, 256-2 are disposed on opposing faces 236, 237 of the saw blade 222.

While various embodiments of the invention have been particularly shown and described, it will be understood by those skilled in the art that various changes in form and details may be made therein without departing from the spirit and scope of the invention as defined by the appended claims.

For example, as indicated above, for the saw blade 122 illustrated in FIG. 5, the relief portion 156 is configured as a concavely-shaped relief and for the saw blade 122 illustrated in FIG. 5, the relief portion 156 is configured as a convexly-shaped relief. Such indication is by way of example only. In one arrangement, the relief portion 256 is configured as a chamfer or bevel shaped relief portion, such as a chamfer or bevel having a relatively flat (i.e., non-rounded) shape relative to the saw blade body 36.

What is claimed is:

1. A saw blade, comprising:
a saw blade body having a first face, a second face opposing the first face, and an axis of rotation extending between the first face and the second face;
a cutting element disposed about an outer periphery of the saw blade body; and
a spline arbor interface portion disposed about an inner periphery of the saw blade body and having a peripheral face defining an eye disposed substantially collinearly with the axis of rotation of the saw blade body, the saw blade body defining a relief portion extending along at least a portion of an edge between the peripheral face of the spline arbor interface portion and at least one of the first face and the second face,
wherein the spline arbor interface portion comprises a set of major diameter interface elements and a set of minor diameter interface elements, the relief portion extending along at least a portion of an edge between at least one major diameter interface element of the set of major diameter interface elements and at least one of the first face and the second face;
wherein at least one major diameter interface element defines a curved lobe shape relative to adjacent minor diameter interface elements.

2. The saw blade of claim 1, wherein the relief portion extends along at least a portion of an edge between a drive portion of the at least one major diameter interface element of the set of major diameter interface elements and at least one of the first face and the second face.

3. The saw blade of claim 1, wherein the relief portion is configured as a concavely-shaped relief portion.

4. The saw blade of claim 2, wherein the drive portion of each major diameter interface element of the set of major diameter interface elements is configured to contact a corresponding drive portion of a spline arbor.

5. The saw blade of claim 1, wherein the spline arbor interface portion of the saw blade is configured to define a clearance space of between about 0.007 inches and 0.015 inches with a spline arbor.

6. The saw blade of claim 1, wherein the saw blade is configured to translate along a longitudinal axis of a spline arbor when the spline arbor rotates the saw blade about the longitudinal axis.

7. A cutting system, comprising:
a spline arbor having a set of splines disposed about the periphery of the spline arbor, the set of splines extending along a length of the spline arbor; and
a saw blade carried by the spline arbor, the saw blade having:
a saw blade body having a first face, a second face opposing the first face, and an axis of rotation extending between the first face and the second face;
a cutting element disposed about an outer periphery of the saw blade body; and
a spline arbor interface portion disposed about an inner periphery of the saw blade body and having a peripheral face defining an eye disposed substantially collinearly with the axis of rotation of the saw blade body, the saw blade body defining a relief portion extending along at least a portion of an edge between the peripheral face of the spline arbor interface portion and at least one of the first face and the second face;
wherein the spline arbor interface portion comprises a set of major diameter interface elements and a set of minor diameter interface elements, the relief portion extending along at least a portion of an edge between at least one major diameter interface element of the set of major diameter interface elements and at least one of the first face and the second face;
wherein at least one major diameter interface element defines a curved lobe shape relative to adjacent minor diameter interface elements.

8. The cutting system of claim 7, wherein the relief portion extends along at least a portion of an edge between a drive portion of the at least one major diameter interface element of the set of major diameter interface elements and at least one of the first face and the second face.

9. The cutting system of claim 8, wherein:
the spline arbor is configured to rotate the saw blade about a longitudinal axis; and
the drive portion of each major diameter interface element of the set of major diameter interface elements is configured to contact a corresponding drive portion of the spline arbor when the spline arbor rotates the saw blade about the longitudinal axis.

10. The cutting system of claim 7, wherein the relief portion is configured as a concavely-shaped relief portion.

11. The cutting system of claim 7 wherein the spline arbor interface portion of the saw blade defines a clearance space of between about 0.007 inches and 0.015 inches with the spline arbor.

12. The cutting system of claim 8, wherein the saw blade is configured to translate along a length of the spline arbor when the spline arbor rotates the saw blade about the axis of rotation of the saw blade body.

* * * * *